(12) United States Patent
Reddy et al.

(10) Patent No.: US 10,225,270 B2
(45) Date of Patent: Mar. 5, 2019

(54) STEERING OF CLONED TRAFFIC IN A SERVICE FUNCTION CHAIN

(71) Applicant: CISCO TECHNOLOGY, INC., San Jose, CA (US)

(72) Inventors: K. Tirumaleswar Reddy, Bangalore (IN); Carlos M. Pignataro, Raleigh, NC (US); James Guichard, New Boston, NH (US); Daniel G. Wing, San Jose, CA (US); Michael D. Geller, Weston, FL (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 226 days.

(21) Appl. No.: 15/226,758

(22) Filed: Aug. 2, 2016

(65) Prior Publication Data

US 2018/0041524 A1     Feb. 8, 2018

(51) Int. Cl.
| | | |
|---|---|---|
| *H04L 29/06* | (2006.01) | |
| *H04L 12/701* | (2013.01) | |
| *H04L 29/08* | (2006.01) | |
| *G06F 21/53* | (2013.01) | |

(52) U.S. Cl.
CPC .......... *H04L 63/1416* (2013.01); *H04L 45/00* (2013.01); *H04L 63/1408* (2013.01); *H04L 63/1458* (2013.01); *H04L 67/2804* (2013.01); *H04L 69/22* (2013.01); *G06F 21/53* (2013.01)

(58) Field of Classification Search
None
See application file for complete search history.

(56) References Cited

U.S. PATENT DOCUMENTS

| | | | |
|---|---|---|---|
| 3,629,512 | A | 12/1971 | Yuan |
| 4,769,811 | A | 9/1988 | Eckberg, Jr. et al. |
| 5,408,231 | A | 4/1995 | Bowdon |
| 5,491,690 | A | 2/1996 | Alfonsi et al. |
| 5,557,609 | A | 9/1996 | Shobatake et al. |
| 5,600,638 | A | 2/1997 | Bertin et al. |
| 5,687,167 | A | 11/1997 | Bertin et al. |

(Continued)

FOREIGN PATENT DOCUMENTS

| | | |
|---|---|---|
| CN | 103716123 | 4/2014 |
| CN | 103716137 | 4/2014 |

(Continued)

OTHER PUBLICATIONS

Mortensen, A., et al., "Distributed Denial of Service (DDoS) Open Threat Signaling Requirements," DOTS, Mar. 18, 2016, 16 pages; https://tools.ietf.org/pdf/draft-ietf-dots-requirements-01.pdf.

(Continued)

*Primary Examiner* — Shin-Hon (Eric) Chen
(74) *Attorney, Agent, or Firm* — Polsinelli PC

(57) ABSTRACT

Aspects of the embodiments are directed to a service classifier configured for steering cloned traffic through a service function chain. The service classifier is configured to create a cloned data packet by creating a copy of a data packet; activate a mirror bit in a network service header (NSH) of the cloned data packet, the mirror bit identifying the cloned packet to a service function forwarder network element as a cloned packet; and transmit the cloned packet to the service function forwarder network element.

20 Claims, 9 Drawing Sheets

(56) References Cited

U.S. PATENT DOCUMENTS

| | | |
|---|---|---|
| 6,115,384 A | 9/2000 | Parzych |
| 6,167,438 A | 12/2000 | Yates et al. |
| 6,400,681 B1 | 6/2002 | Bertin et al. |
| 6,661,797 B1 | 12/2003 | Goel et al. |
| 6,687,229 B1 | 2/2004 | Kataria et al. |
| 6,799,270 B1 | 9/2004 | Bull et al. |
| 6,888,828 B1 | 5/2005 | Partanen et al. |
| 6,993,593 B2 | 1/2006 | Iwata |
| 7,027,408 B2 | 4/2006 | Nabkel et al. |
| 7,062,567 B2 | 6/2006 | Benitez et al. |
| 7,095,715 B2 | 8/2006 | Buckman et al. |
| 7,096,212 B2 | 8/2006 | Tribble et al. |
| 7,139,239 B2 | 11/2006 | Mcfarland et al. |
| 7,165,107 B2 | 1/2007 | Pouyoul et al. |
| 7,197,008 B1 | 3/2007 | Shabtay et al. |
| 7,197,660 B1 | 3/2007 | Liu et al. |
| 7,209,435 B1 | 4/2007 | Kuo et al. |
| 7,227,872 B1 | 6/2007 | Biswas et al. |
| 7,231,462 B2 | 6/2007 | Berthaud et al. |
| 7,333,990 B1 | 2/2008 | Thiagarajan et al. |
| 7,443,796 B1 | 10/2008 | Albert et al. |
| 7,458,084 B2 | 11/2008 | Zhang et al. |
| 7,472,411 B2 | 12/2008 | Wing et al. |
| 7,486,622 B2 | 2/2009 | Regan et al. |
| 7,536,396 B2 | 5/2009 | Johnson et al. |
| 7,552,201 B2 | 6/2009 | Areddu et al. |
| 7,558,261 B2 | 7/2009 | Arregoces et al. |
| 7,567,504 B2 | 7/2009 | Darling et al. |
| 7,571,470 B2 | 8/2009 | Arregoces et al. |
| 7,573,879 B2 | 8/2009 | Narad et al. |
| 7,610,375 B2 | 10/2009 | Portolani et al. |
| 7,643,468 B1 | 1/2010 | Arregoces et al. |
| 7,644,182 B2 | 1/2010 | Banerjee et al. |
| 7,647,422 B2 | 1/2010 | Singh et al. |
| 7,657,898 B2 | 2/2010 | Sadiq |
| 7,657,940 B2 | 2/2010 | Portolani et al. |
| 7,668,116 B2 | 2/2010 | Wijnands et al. |
| 7,684,321 B2 | 3/2010 | Muirhead et al. |
| 7,738,469 B1 | 6/2010 | Shekokar et al. |
| 7,751,409 B1 | 7/2010 | Carolan |
| 7,793,157 B2 | 9/2010 | Bailey et al. |
| 7,814,284 B1 | 10/2010 | Glass et al. |
| 7,831,693 B2 | 11/2010 | Lai |
| 7,852,785 B2 * | 12/2010 | Lund ............ H04L 43/026 370/252 |
| 7,860,095 B2 | 12/2010 | Forissier et al. |
| 7,860,100 B2 | 12/2010 | Khalid et al. |
| 7,895,425 B2 | 2/2011 | Khalid et al. |
| 7,899,012 B2 | 3/2011 | Ho et al. |
| 7,899,861 B2 | 3/2011 | Feblowitz et al. |
| 7,907,595 B2 | 3/2011 | Khanna et al. |
| 7,908,480 B2 | 3/2011 | Firestone et al. |
| 7,983,174 B1 | 7/2011 | Monaghan et al. |
| 7,990,847 B1 | 8/2011 | Leroy et al. |
| 8,000,329 B2 | 8/2011 | Fendick et al. |
| 8,018,938 B1 | 9/2011 | Fromm et al. |
| 8,094,575 B1 | 1/2012 | Vadlakonda et al. |
| 8,095,683 B2 | 1/2012 | Balasubramanian Chandra |
| 8,116,307 B1 * | 2/2012 | Thesayi ............ H04L 45/00 370/389 |
| 8,166,465 B2 | 4/2012 | Feblowitz et al. |
| 8,180,909 B2 | 5/2012 | Hartman et al. |
| 8,191,119 B2 | 5/2012 | Wing et al. |
| 8,195,774 B2 | 6/2012 | Lambeth et al. |
| 8,280,354 B2 | 10/2012 | Smith et al. |
| 8,281,302 B2 | 10/2012 | Durazzo et al. |
| 8,291,108 B2 | 10/2012 | Raja et al. |
| 8,305,900 B2 | 11/2012 | Bianconi |
| 8,311,045 B2 | 11/2012 | Quinn et al. |
| 8,316,457 B1 | 11/2012 | Paczkowski et al. |
| 8,355,332 B2 | 1/2013 | Beaudette et al. |
| 8,442,043 B2 | 5/2013 | Sharma et al. |
| 8,451,817 B2 * | 5/2013 | Cheriton ............ H04L 47/10 370/349 |
| 8,464,336 B2 | 6/2013 | Wei et al. |
| 8,473,981 B1 | 6/2013 | Gargi |
| 8,479,298 B2 | 7/2013 | Keith et al. |
| 8,498,414 B2 | 7/2013 | Rossi |
| 8,520,672 B2 | 8/2013 | Guichard et al. |
| 8,601,152 B1 | 12/2013 | Chou |
| 8,605,588 B2 | 12/2013 | Sankaran et al. |
| 8,612,612 B1 | 12/2013 | Dukes et al. |
| 8,627,328 B2 | 1/2014 | Mousseau et al. |
| 8,645,952 B2 | 2/2014 | Biswas et al. |
| 8,676,965 B2 | 3/2014 | Gueta |
| 8,676,980 B2 | 3/2014 | Kreeger et al. |
| 8,700,892 B2 | 4/2014 | Bollay et al. |
| 8,724,466 B2 * | 5/2014 | Kenigsberg ............ H04L 49/208 370/235 |
| 8,730,980 B2 | 5/2014 | Bagepalli et al. |
| 8,743,885 B2 | 6/2014 | Khan et al. |
| 8,751,420 B2 | 6/2014 | Hjelm et al. |
| 8,762,534 B1 | 6/2014 | Hong et al. |
| 8,762,707 B2 | 6/2014 | Killian et al. |
| 8,792,490 B2 | 7/2014 | Jabr et al. |
| 8,793,400 B2 | 7/2014 | Mcdysan et al. |
| 8,812,730 B2 | 8/2014 | Vos et al. |
| 8,819,419 B2 | 8/2014 | Carlson et al. |
| 8,825,070 B2 | 9/2014 | Akhtar et al. |
| 8,830,834 B2 | 9/2014 | Sharma et al. |
| 8,904,037 B2 | 12/2014 | Haggar et al. |
| 8,984,284 B2 | 3/2015 | Purdy, Sr. et al. |
| 9,001,827 B2 | 4/2015 | Appenzeller |
| 9,071,533 B2 | 6/2015 | Hui et al. |
| 9,077,661 B2 | 7/2015 | Andreasen et al. |
| 9,088,584 B2 | 7/2015 | Feng et al. |
| 9,130,872 B2 | 9/2015 | Kumar et al. |
| 9,143,438 B2 | 9/2015 | Khan et al. |
| 9,160,797 B2 | 10/2015 | Mcdysan |
| 9,178,812 B2 | 11/2015 | Guichard et al. |
| 9,189,285 B2 | 11/2015 | Ng et al. |
| 9,203,711 B2 | 12/2015 | Agarwal et al. |
| 9,253,274 B2 | 2/2016 | Quinn et al. |
| 9,300,579 B2 | 3/2016 | Frost et al. |
| 9,300,585 B2 | 3/2016 | Kumar et al. |
| 9,311,130 B2 | 4/2016 | Christenson et al. |
| 9,319,324 B2 | 4/2016 | Beheshti-Zavareh et al. |
| 9,325,565 B2 | 4/2016 | Yao et al. |
| 9,338,097 B2 | 5/2016 | Anand et al. |
| 9,344,337 B2 | 5/2016 | Kumar et al. |
| 9,374,297 B2 | 6/2016 | Bosch et al. |
| 9,379,931 B2 | 6/2016 | Bosch et al. |
| 9,385,950 B2 | 7/2016 | Quinn et al. |
| 9,398,486 B2 | 7/2016 | La Roche, Jr. et al. |
| 9,407,540 B2 | 8/2016 | Kumar et al. |
| 9,413,655 B2 | 8/2016 | Shatzkamer et al. |
| 9,424,065 B2 | 8/2016 | Singh et al. |
| 9,436,443 B2 | 9/2016 | Chiosi et al. |
| 9,444,675 B2 | 9/2016 | Guichard et al. |
| 9,473,570 B2 | 10/2016 | Bhanujan et al. |
| 9,479,443 B2 | 10/2016 | Bosch et al. |
| 9,491,094 B2 | 11/2016 | Patwardhan et al. |
| 9,537,836 B2 | 1/2017 | Mailer et al. |
| 9,558,029 B2 | 1/2017 | Behera et al. |
| 9,559,970 B2 | 1/2017 | Kumar et al. |
| 9,571,405 B2 | 2/2017 | Pignataro et al. |
| 9,608,896 B2 | 3/2017 | Kumar et al. |
| 9,614,739 B2 | 4/2017 | Kumar et al. |
| 9,660,909 B2 | 5/2017 | Guichard et al. |
| 9,723,106 B2 | 8/2017 | Shen et al. |
| 9,774,533 B2 | 9/2017 | Zhang et al. |
| 9,794,379 B2 | 10/2017 | Kumar et al. |
| 9,882,776 B2 * | 1/2018 | Aybay ............ H04L 41/0813 |
| 9,929,945 B2 | 3/2018 | Schultz et al. |
| 10,003,530 B2 | 6/2018 | Zhang et al. |
| 2001/0023442 A1 | 9/2001 | Masters |
| 2002/0085562 A1 | 7/2002 | Hufferd et al. |
| 2002/0131362 A1 | 9/2002 | Callon |
| 2002/0156893 A1 | 10/2002 | Pouyoul et al. |
| 2002/0167935 A1 | 11/2002 | Nabkel et al. |
| 2003/0023879 A1 | 1/2003 | Wray |
| 2003/0026257 A1 | 2/2003 | Xu et al. |
| 2003/0037070 A1 | 2/2003 | Marston |
| 2003/0088698 A1 | 5/2003 | Singh et al. |

(56) References Cited

U.S. PATENT DOCUMENTS

| | | |
|---|---|---|
| 2003/0110081 A1 | 6/2003 | Tosaki et al. |
| 2003/0120816 A1 | 6/2003 | Berthaud et al. |
| 2003/0214913 A1 | 11/2003 | Kan et al. |
| 2003/0226142 A1 | 12/2003 | Rand |
| 2004/0109412 A1 | 6/2004 | Hansson et al. |
| 2004/0148391 A1 | 7/2004 | Lake, Sr. et al. |
| 2004/0199812 A1 | 10/2004 | Earl |
| 2004/0213160 A1 | 10/2004 | Regan et al. |
| 2004/0264481 A1 | 12/2004 | Darling et al. |
| 2004/0268357 A1 | 12/2004 | Joy et al. |
| 2005/0044197 A1 | 2/2005 | Lai |
| 2005/0058118 A1 | 3/2005 | Davis |
| 2005/0060572 A1 | 3/2005 | Kung |
| 2005/0086367 A1 | 4/2005 | Conta et al. |
| 2005/0120101 A1 | 6/2005 | Nocera |
| 2005/0152378 A1 | 7/2005 | Bango et al. |
| 2005/0157645 A1 | 7/2005 | Rabie et al. |
| 2005/0160180 A1 | 7/2005 | Rabje et al. |
| 2005/0204042 A1 | 9/2005 | Banerjee et al. |
| 2005/0210096 A1 | 9/2005 | Bishop et al. |
| 2005/0257002 A1 | 11/2005 | Nguyen |
| 2005/0281257 A1 | 12/2005 | Yazaki et al. |
| 2005/0286540 A1 | 12/2005 | Hurtta et al. |
| 2005/0289244 A1 | 12/2005 | Sahu et al. |
| 2006/0005240 A1 | 1/2006 | Sundarrajan et al. |
| 2006/0031374 A1 | 2/2006 | Lu et al. |
| 2006/0045024 A1 | 3/2006 | Previdi et al. |
| 2006/0074502 A1 | 4/2006 | Mcfarland |
| 2006/0092950 A1 | 5/2006 | Arregoces et al. |
| 2006/0095960 A1 | 5/2006 | Arregoces et al. |
| 2006/0112400 A1 | 5/2006 | Zhang et al. |
| 2006/0155862 A1 | 7/2006 | Kathi et al. |
| 2006/0168223 A1 | 7/2006 | Mishra et al. |
| 2006/0233106 A1 | 10/2006 | Achlioptas et al. |
| 2006/0233155 A1 | 10/2006 | Srivastava |
| 2007/0061441 A1 | 3/2007 | Landis et al. |
| 2007/0067435 A1 | 3/2007 | Landis et al. |
| 2007/0094397 A1* | 4/2007 | Krelbaum ............ H04L 43/065 709/227 |
| 2007/0143851 A1 | 6/2007 | Nicodemus et al. |
| 2007/0237147 A1 | 10/2007 | Quinn et al. |
| 2007/0250836 A1 | 10/2007 | Li et al. |
| 2008/0056153 A1 | 3/2008 | Liu |
| 2008/0080509 A1 | 4/2008 | Khanna et al. |
| 2008/0080517 A1 | 4/2008 | Roy et al. |
| 2008/0170542 A1 | 7/2008 | Hu |
| 2008/0177896 A1 | 7/2008 | Quinn et al. |
| 2008/0181118 A1 | 7/2008 | Sharma et al. |
| 2008/0196083 A1 | 8/2008 | Parks et al. |
| 2008/0209039 A1 | 8/2008 | Tracey et al. |
| 2008/0219287 A1 | 9/2008 | Krueger et al. |
| 2008/0225710 A1 | 9/2008 | Raja et al. |
| 2008/0291910 A1 | 11/2008 | Tadimeti et al. |
| 2009/0003364 A1 | 1/2009 | Fendick et al. |
| 2009/0006152 A1 | 1/2009 | Timmerman et al. |
| 2009/0037713 A1 | 2/2009 | Khalid et al. |
| 2009/0094684 A1 | 4/2009 | Chinnusamy et al. |
| 2009/0204612 A1 | 8/2009 | Keshavarz-nia et al. |
| 2009/0271656 A1 | 10/2009 | Yokota et al. |
| 2009/0300207 A1 | 12/2009 | Giaretta et al. |
| 2009/0305699 A1 | 12/2009 | Deshpande et al. |
| 2009/0328054 A1 | 12/2009 | Paramasivam et al. |
| 2010/0058329 A1 | 3/2010 | Durazzo et al. |
| 2010/0063988 A1 | 3/2010 | Khalid |
| 2010/0080226 A1 | 4/2010 | Khalid |
| 2010/0165985 A1 | 7/2010 | Sharma et al. |
| 2010/0191612 A1 | 7/2010 | Raleigh |
| 2010/0211658 A1 | 8/2010 | Hoogerwerf et al. |
| 2011/0023090 A1 | 1/2011 | Asati et al. |
| 2011/0032833 A1 | 2/2011 | Zhang et al. |
| 2011/0055845 A1 | 3/2011 | Nandagopal et al. |
| 2011/0131338 A1 | 6/2011 | Hu |
| 2011/0137991 A1 | 6/2011 | Russell |
| 2011/0142056 A1 | 6/2011 | Manoj |
| 2011/0161494 A1 | 6/2011 | Mcdysan et al. |
| 2011/0222412 A1 | 9/2011 | Kompella |
| 2011/0255538 A1 | 10/2011 | Srinivasan et al. |
| 2011/0267947 A1 | 11/2011 | Dhar et al. |
| 2012/0131662 A1 | 5/2012 | Kuik et al. |
| 2012/0147894 A1 | 6/2012 | Mulligan et al. |
| 2012/0324442 A1 | 12/2012 | Barde |
| 2012/0331135 A1 | 12/2012 | Alon et al. |
| 2013/0003735 A1 | 1/2013 | Chao et al. |
| 2013/0003736 A1 | 1/2013 | Szyszko et al. |
| 2013/0040640 A1 | 2/2013 | Chen et al. |
| 2013/0044636 A1 | 2/2013 | Koponen et al. |
| 2013/0121137 A1 | 5/2013 | Feng et al. |
| 2013/0124708 A1 | 5/2013 | Lee et al. |
| 2013/0163594 A1 | 6/2013 | Sharma et al. |
| 2013/0163606 A1 | 6/2013 | Bagepalli et al. |
| 2013/0238806 A1 | 9/2013 | Moen |
| 2013/0272305 A1 | 10/2013 | Lefebvre et al. |
| 2013/0311675 A1 | 11/2013 | Kancherla |
| 2013/0329584 A1 | 12/2013 | Ghose et al. |
| 2014/0010083 A1 | 1/2014 | Hamdi et al. |
| 2014/0010096 A1 | 1/2014 | Kamble et al. |
| 2014/0036730 A1 | 2/2014 | Nellikar et al. |
| 2014/0050223 A1 | 2/2014 | Foo et al. |
| 2014/0067758 A1 | 3/2014 | Boldyrev et al. |
| 2014/0105062 A1 | 4/2014 | McDysan et al. |
| 2014/0181267 A1 | 6/2014 | Wadkins et al. |
| 2014/0254603 A1 | 9/2014 | Banavalikar et al. |
| 2014/0259012 A1 | 9/2014 | Nandlall et al. |
| 2014/0279863 A1 | 9/2014 | Krishnamurthy et al. |
| 2014/0280836 A1 | 9/2014 | Kumar et al. |
| 2014/0317261 A1 | 10/2014 | Shatzkamer et al. |
| 2014/0321459 A1 | 10/2014 | Kumar et al. |
| 2014/0334295 A1 | 11/2014 | Guichard et al. |
| 2014/0344439 A1 | 11/2014 | Kempf et al. |
| 2014/0362682 A1 | 12/2014 | Guichard et al. |
| 2014/0362857 A1 | 12/2014 | Guichard et al. |
| 2014/0369209 A1 | 12/2014 | Khurshid et al. |
| 2014/0376558 A1 | 12/2014 | Rao et al. |
| 2015/0003455 A1 | 1/2015 | Haddad et al. |
| 2015/0012584 A1 | 1/2015 | Lo et al. |
| 2015/0012988 A1 | 1/2015 | Jeng et al. |
| 2015/0029871 A1 | 1/2015 | Frost et al. |
| 2015/0032871 A1 | 1/2015 | Allan et al. |
| 2015/0052516 A1 | 2/2015 | French et al. |
| 2015/0071285 A1 | 3/2015 | Kumar et al. |
| 2015/0074276 A1 | 3/2015 | DeCusatis et al. |
| 2015/0082308 A1 | 3/2015 | Kiess et al. |
| 2015/0085635 A1 | 3/2015 | Wijnands et al. |
| 2015/0085870 A1 | 3/2015 | Narasimha et al. |
| 2015/0089082 A1 | 3/2015 | Patwardhan et al. |
| 2015/0092564 A1 | 4/2015 | Aldrin |
| 2015/0103827 A1 | 4/2015 | Quinn et al. |
| 2015/0117308 A1 | 4/2015 | Kant |
| 2015/0124622 A1 | 5/2015 | Kovvali et al. |
| 2015/0131484 A1 | 5/2015 | Aldrin |
| 2015/0131660 A1 | 5/2015 | Shepherd et al. |
| 2015/0156035 A1 | 6/2015 | Foo et al. |
| 2015/0180725 A1 | 6/2015 | Varney et al. |
| 2015/0180767 A1 | 6/2015 | Tam et al. |
| 2015/0181309 A1 | 6/2015 | Shepherd et al. |
| 2015/0188949 A1 | 7/2015 | Mahaffey et al. |
| 2015/0195197 A1 | 7/2015 | Yong et al. |
| 2015/0222516 A1 | 8/2015 | Deval et al. |
| 2015/0222533 A1 | 8/2015 | Birrittella et al. |
| 2015/0236948 A1 | 8/2015 | Dunbar et al. |
| 2015/0319078 A1 | 11/2015 | Lee et al. |
| 2015/0319081 A1 | 11/2015 | Kasturi et al. |
| 2015/0326473 A1 | 11/2015 | Dunbar et al. |
| 2015/0333930 A1 | 11/2015 | Aysola et al. |
| 2015/0334027 A1 | 11/2015 | Bosch et al. |
| 2015/0341285 A1 | 11/2015 | Aysola et al. |
| 2015/0365495 A1 | 12/2015 | Fan et al. |
| 2015/0381465 A1 | 12/2015 | Narayanan et al. |
| 2015/0381557 A1 | 12/2015 | Fan et al. |
| 2016/0028604 A1 | 1/2016 | Chakrabarti et al. |
| 2016/0028640 A1 | 1/2016 | Zhang et al. |
| 2016/0043952 A1 | 2/2016 | Zhang et al. |
| 2016/0050117 A1 | 2/2016 | Voellmy et al. |
| 2016/0050132 A1 | 2/2016 | Zhang |

(56) References Cited

U.S. PATENT DOCUMENTS

| | | |
|---|---|---|
| 2016/0080263 A1 | 3/2016 | Park et al. |
| 2016/0080496 A1 | 3/2016 | Falanga et al. |
| 2016/0099853 A1 | 4/2016 | Nedeltchev et al. |
| 2016/0119159 A1 | 4/2016 | Zhao et al. |
| 2016/0119253 A1 | 4/2016 | Kang et al. |
| 2016/0127139 A1 | 5/2016 | Tian et al. |
| 2016/0134518 A1 | 5/2016 | Callon et al. |
| 2016/0134535 A1 | 5/2016 | Callon |
| 2016/0139939 A1 | 5/2016 | Bosch et al. |
| 2016/0164776 A1 | 6/2016 | Biancaniello |
| 2016/0165014 A1 | 6/2016 | Nainar et al. |
| 2016/0173373 A1 | 6/2016 | Guichard et al. |
| 2016/0173464 A1 | 6/2016 | Wang et al. |
| 2016/0182336 A1 | 6/2016 | Doctor et al. |
| 2016/0182342 A1* | 6/2016 | Singaravelu ............ H04L 43/16 370/253 |
| 2016/0182684 A1* | 6/2016 | Connor ............... G06F 9/45558 709/203 |
| 2016/0212017 A1 | 7/2016 | Li et al. |
| 2016/0226742 A1 | 8/2016 | Apathotharanan et al. |
| 2016/0248685 A1 | 8/2016 | Pignataro et al. |
| 2016/0277250 A1 | 9/2016 | Maes |
| 2016/0285720 A1 | 9/2016 | Mäenpää et al. |
| 2016/0323165 A1 | 11/2016 | Boucadair et al. |
| 2016/0352629 A1 | 12/2016 | Wang et al. |
| 2016/0380966 A1 | 12/2016 | Gunnalan et al. |
| 2017/0019303 A1 | 1/2017 | Swamy et al. |
| 2017/0031804 A1 | 2/2017 | Ciszewski et al. |
| 2017/0078175 A1 | 3/2017 | Xu et al. |
| 2017/0187609 A1 | 6/2017 | Lee et al. |
| 2017/0208000 A1 | 7/2017 | Bosch et al. |
| 2017/0214627 A1 | 7/2017 | Zhang et al. |
| 2017/0237656 A1 | 8/2017 | Gage et al. |
| 2017/0250917 A1 | 8/2017 | Ruckstuhl et al. |
| 2017/0272470 A1 | 9/2017 | Gundamaraju et al. |
| 2017/0279712 A1 | 9/2017 | Nainar et al. |
| 2017/0310611 A1 | 10/2017 | Kumar et al. |
| 2017/0331741 A1 | 11/2017 | Fedyk et al. |
| 2018/0013841 A1 | 1/2018 | Nainar et al. |
| 2018/0026884 A1 | 1/2018 | Nainar et al. |
| 2018/0026887 A1 | 1/2018 | Nainar et al. |
| 2018/0041470 A1 | 2/2018 | Schultz et al. |
| 2018/0062991 A1 | 3/2018 | Nainar et al. |

FOREIGN PATENT DOCUMENTS

| | | |
|---|---|---|
| EP | 3160073 | 4/2017 |
| JP | 2016149686 | 8/2016 |
| WO | WO 2011/029321 | 3/2011 |
| WO | WO 2012/056404 | 5/2012 |
| WO | WO 2015/065353 | 5/2015 |
| WO | WO 2015/180559 | 12/2015 |
| WO | WO 2015/187337 | 12/2015 |
| WO | WO 2016/004556 | 1/2016 |
| WO | WO 2016/058245 | 4/2016 |
| WO | WO 2017/011607 | 1/2017 |

OTHER PUBLICATIONS

Quinn, P., et al., "Network Service Header," Network Working Group, Mar. 24, 2015, 42 pages; https://tools.ietf.org/pdf/draft-ietf-sfc-nsh-00.pdf.

Newman, "Review: FireEye fights off multi-stage malware," Network World, May 5, 2014, 7 pages; http://www.networkworld.com/article/2176480/network-security/review-- fireeye-fights-off-multi-stage-malware.html/.

Halpern, J., et al., "Service Function Chaining (SFC) Architecture," Internet Engineering Task Force (IETF), RFC 7665, Oct. 2015, 32 pages; https://tools.ietf.org/html/rfc7665.

Aldrin, S., et al. "Service Function Chaining Operation, Administration and Maintenance Framework," Internet Engineering Task Force, Oct. 26, 2014, 13 pages.

Alizadeh, Mohammad, et al., "CONGA: Distributed Congestion-Aware Load Balancing for Datacenters," SIGCOMM '14, Aug. 17-22, 2014, 12 pages.

Author Unknown, "ANSI/SCTE 35 2007 Digital Program Insertion Cueing Message for Cable," Engineering Committee, Digital Video Subcommittee, American National Standard, Society of Cable Telecommunications Engineers, © Society of Cable Telecommunications Engineers, Inc. 2007 All Rights Reserved, 140 Philips Road, Exton, PA 19341; 42 pages.

Author Unknown, "AWS Lambda Developer Guide," Amazon Web Services Inc., May 2017, 416 pages.

Author Unknown, "CEA-708," from Wikipedia, the free encyclopedia, Nov. 15, 2012; 16 pages http://en.wikipedia.org/w/index.php?title=CEA-708&oldid=523143431.

Author Unknown, "Cisco and Intel High-Performance VNFs on Cisco NFV Infrastructure," White Paper, Cisco and Intel, Oct. 2016, 7 pages.

Author Unknown, "Cloud Functions Overview," Cloud Functions Documentation, Mar. 21, 2017, 3 pages; http://could.google.com/functions/docs/concepts/overview.

Author Unknown, "Cloud-Native VNF Modelling," Open Source Mano, © ETSI 2016, 18 pages.

Author Unknown, "Digital Program Insertion," from Wikipedia, the free encyclopedia, Jan. 2, 2012; 1 page http://en.wikipedia.org/w/index.php?title=Digital_Program_insertion&oldid=469076482.

Author Unknown, "Dynamic Adaptive Streaming over HTTP," from Wikipedia, the free encyclopedia, Oct. 25, 2012; 3 pages, http://en.wikipedia.org/w/index.php?title=Dynannic_Adaptive_Streanning_over_HTTP&oldid=519749189.

Author Unknown, "GStreamer and in-band metadata," from RidgeRun Developer Connection, Jun. 19, 2012, 5 pages https://developersidgerun.conn/wiki/index.php/GStreanner_and_in-band_nnetadata.

Author Unknown, "IEEE Standard for the Functional Architecture of Next Generation Service Overlay Networks, IEEE Std. 1903-2011," IEEE, Piscataway, NJ, Oct. 7, 2011; 147 pages.

Author Unknown, "ISO/IEC JTC 1/SC 29, Information Technology—Dynamic Adaptive Streaming over HTTP (DASH)—Part 1: Media Presentation Description and Segment Formats," International Standard © ISO/IEC 2012—All Rights Reserved; Jan. 5, 2012; 131 pages.

Author Unknown, "M-PEG 2 Transmission," © Dr. Gorry Fairhurst, 9 pages [Published on or about Jan. 12, 2012] http://www.erg.abdn.ac.uk/future-net/digital-video/mpeg2-trans.html.

Author Unknown, "MPEG Transport Stream," from Wikipedia, the free encyclopedia, Nov. 11, 2012; 7 pages, http://en.wikipedia.org/w/index.php?title=MPEG_transport_streann&oldid=522468296.

Author Unknown, "Network Functions Virtualisation (NFV); Use Cases," ETSI, GS NFV 001 v1.1.1, Architectural Framework, © European Telecommunications Standards Institute, Oct. 2013, 50 pages.

Author Unknown, "OpenNebula 4.6 User Guide," Jun. 12, 2014, opennebula.org, 87 pages.

Author Unknown, "Understanding Azure, A Guide for Developers," Microsoft Corporation, Copyright © 2016 Microsoft Corporation, 39 pages.

Author Unknown, "3GPP TR 23.803 V7.0.0 (Sep. 2005) Technical Specification: Group Services and System Aspects; Evolution of Policy Control and Charging (Release 7)," 3rd Generation Partnership Project (3GPP), 650 Route des Lucioles—Sophia Antipolis Valbonne—France, Sep. 2005; 30 pages.

Author Unknown, "3GPP TS 23.203 V8.9.0 (Mar. 2010) Technical Specification: Group Services and System Aspects; Policy and Charging Control Architecture (Release 8)," 3rd Generation Partnership Project (3GPP), 650 Route des Lucioles—Sophia Antipolis Val bonne—France, Mar. 2010; 116 pages.

Author Unknown, "3GPP TS 23.401 V13.5.0 (Dec. 2015) Technical Specification: 3rd Generation Partnership Project; Technical Specification Group Services and System Aspects; General Packet Radio Service (GPRS) enhancements for Evolved Universal Terrestrial Radio Access Network (E-UTRAN) access (Release 13)," 3GPP, 650 Route des Lucioles—Sophia Antipolis Valbonne—France, Dec. 2015, 337 pages.

(56) References Cited

OTHER PUBLICATIONS

Author Unknown, "3GPP TS 23.401 V9.5.0 (Jun. 2010) Technical Specification: Group Services and Systems Aspects; General Packet Radio Service (GPRS) Enhancements for Evolved Universal Terrestrial Radio Access Network (E-UTRAN) Access (Release 9)," 3rd Generation Partnership Project (3GPP), 650 Route des Lucioles—Sophia Antipolis Valbonne—France, Jun. 2010; 259 pages.

Author Unknown, "3GPP TS 29.212 V13.1.0 (Mar. 2015) Technical Specification: 3rd Generation Partnership Project; Technical Specification Group Core Network and Terminals; Policy and Charging Control (PCC); Reference points (Release 13)," 3rd Generation Partnership Project (3GPP), 650 Route des Lucioles—Sophia Antipolis Valbonne—France, Mar. 2015; 230 pages.

Author Unknown, "Service-Aware Network Architecture Based on SDN, NFV, and Network Intelligence," 2014, 8 pages.

Baird, Andrew, et al. "AWS Serverless Multi-Tier Architectures; Using Amazon API Gateway and AWS Lambda," Amazon Web Services Inc., Nov. 2015, 20 pages.

Bi, Jing, et al., "Dynamic Provisioning Modeling for Virtualized Multi-tier Applications in Cloud Data Center," 2010 IEEE $3^{rd}$ International Conference on Cloud Computing, Jul. 5, 2010, pp. 370-377, IEEE Computer Society.

Bitar, N., et al., "Interface to the Routing System (I2RS) for the Service Chaining: Use Cases and Requirements," draft-bitar-i2rs-service-chaining-01, Feb. 14, 2014, pp. 1-15.

Boucadair, Mohamed, et al., "Differentiated Service Function Chaining Framework," Network Working Group Internet Draft draft-boucadair-network-function-chaining-03, Aug. 21, 2013, 21 pages.

Bremler-Barr, Anat, et al., "Deep Packet Inspection as a Service," CoNEXT '14, Dec. 2-5, 2014, pp. 271-282.

Cisco Systems, Inc. "Cisco NSH Service Chaining Configuration Guide," Jul. 28, 2017, 11 pages.

Cisco Systems, Inc. "Cisco VN-LINK: Virtualization-Aware Networking," 2009, 9 pages.

Dunbar, et al., "Architecture for Chaining Legacy Layer 4-7 Service Functions," IETF Network Working Group Internet Draft, draft-dunbar-sfc-legacy-14-17-chain-architecture-03.txt, Feb. 10, 2014; 17 pages.

Ersue, Mehmet, "ETSI NFV Management and Orchestration—An Overview," Presentation at the IETF# 88 Meeting, Nov. 3, 2013, 14 pages.

Farrel, A., et al., "A Path Computation Element (PCE)—Based Architecture," RFC 4655, Network Working Group, Aug. 2006, 40 pages.

Fayaz, Seyed K., et al., "Efficient Network Reachability Analysis using a Succinct Control Plane Representation," 2016, ratul.org, pp. 1-16.

Hendrickson, Scott, et al. "Serverless Computation with OpenLambda," Elastic 60, University of Wisconson, Madison, Jun. 20, 2016, 7 pages, https://www.usenix.org/system/files/conference/hotcloud16/hotcloud16_hendrickson.pdf.

Jiang, Y., et al., "An Architecture of Service Function Chaining," IETF Network Working Group Internet Draft, draft-jiang-sfc-arch-01.txt, Feb. 14, 2014; 12 pages.

Jiang, Yuanlong, et al., "Fault Management in Service Function Chaining," Network Working Group, China Telecom, Oct. 16, 2015, 13 pages.

Katsikas, Goergios P., et al., "Profiling and accelerating commodity NFV service chains with SCC," The Journal of Systems and Software, vol. 127, Jan. 2017, pp. 12-27.

Kumar, Surendra, et al., "Service Function Path Optimization: draft-kumar-sfc-sfp-optimization-00.txt," Internet Engineering Task Force, IETF; Standard Working Draft, May 10, 2014, 14 pages.

Kumbhare, Abhijit, et al., "Opendaylight Service Function Chaining Use-Cases," Oct. 14, 2014, 25 pages.

Li, Hongyu, "Service Function Chaining Use Cases", IETF 88 Vancouver, Nov. 7, 2013, 7 pages.

Nguyen, Kim-Khoa, et al. "Distributed Control Plane Architecture of Next Generation IP Routers," IEEE, 2009, 8 pages.

Penno, Reinaldo, et al. "Packet Generation in Service Function Chains," draft-penno-sfc-packet-03, Apr. 29, 2016, 25 pages.

Penno, Reinaldo, et al. "Services Function Chaining Traceroute," draft-penno-sfc-trace-03, Sep. 30, 2015, 9 pages.

Pierre-Louis, Marc-Arhtur, "OpenWhisk: A quick tech preview," DeveloperWorks Open, IBM, Feb. 22, 2016, modified Mar. 3, 2016, 7 pages; https://developer.ibm.com/open/2016/02/22/openwhisk-a-quick-tech-preview/.

Pujol, Pua Capdevila, "Deployment of NFV and SFC scenarios," EETAC, Master Thesis, Advisor: David Rincon Rivera, Universitat Politecnica De Catalunya, Feb. 17, 2017, 115 pages.

Quinn, P., et al., "Network Service Chaining Problem Statement," draft-quinn-nsc-problem-statement-03.txt, Aug. 26, 2013, 18 pages.

Quinn, Paul, et al., "Network Service Header," Network Working Group, draft-quinn-sfc-nsh-02.txt, Feb. 14, 2014, 21 pages.

Quinn, Paul, et al., "Network Service Header," Network Working Group, draft-quinn-nsh-00.txt, Jun. 13, 2013, 20 pages.

Quinn, Paul, et al., "Network Service Header," Network Working Group Internet Draft draft-quinn-nsh-01, Jul. 12, 2013, 20 pages.

Quinn, Paul, et al., "Service Function Chaining (SFC) Architecture," Network Working Group Internet Draft draft-quinn-sfc-arch-05.txt, May 5, 2014, 31 pages.

Quinn, Paul, et al., "Service Function Chaining: Creating a Service Plane via Network Service Headers," IEEE Computer Society, 2014, pp. 38-44.

Wong, Fei, et al., "SMPTE-TT Embedded in ID3 for HTTP Live Streaming, draft-smpte-id3-http-live-streaming-00," Information Internet Draft, Jun. 2012, 7 pages http://tools.ietf.org/htnnl/draft-snnpte-id3-http-live-streaming-00.

Yadav, Rishi, "What Real Cloud-Native Apps Will Look Like," Crunch Network, posted Aug. 3, 2016, 8 pages; https://techcrunch.com/2016/08/03/what-real-cloud-native-apps-will-look-like/.

Zhang, Ying, et al. "StEERING: A Software-Defined Networking for Inline Service Chaining," IEEE, 2013, IEEE, p. 10 pages.

\* cited by examiner

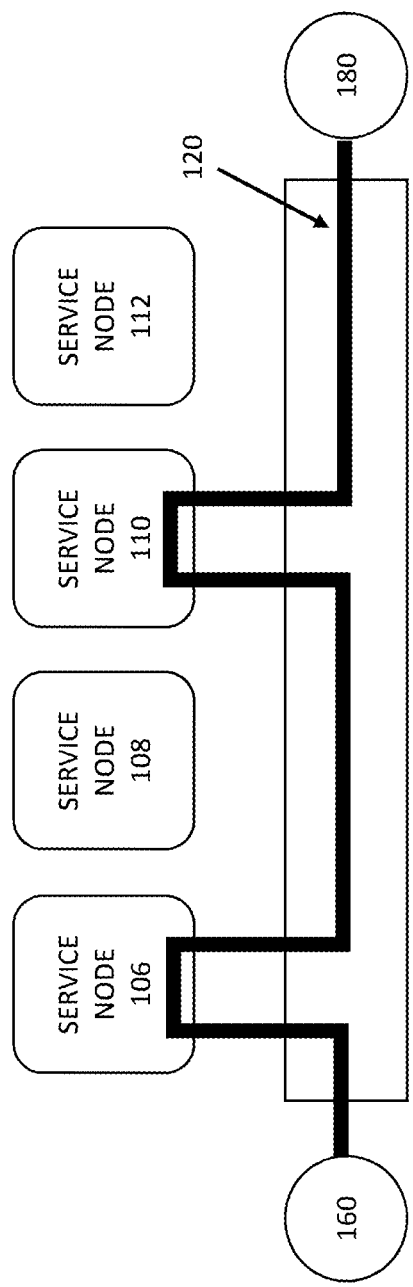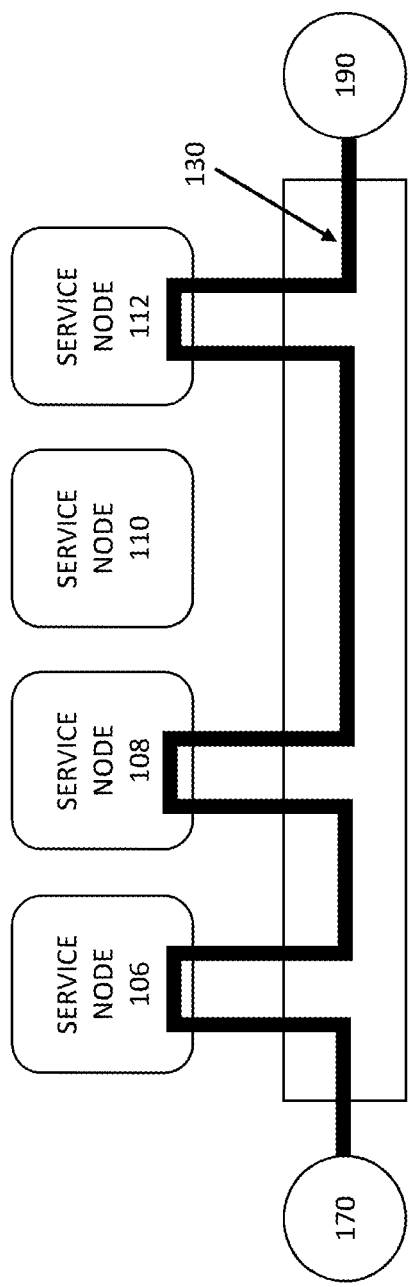

NSH Base Header:

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|Ver|O|C|R|R|R|M|R|R|    Length   |    MD Type    | Next Protocol |
+-+-+-+-+-+-+-+-+-+-+-+-+-+-+-+-+-+-+-+-+-+-+-+-+-+-+-+-+-+-+-+-+
                   ^                              704
                   |
    +--- M - "Mirrored" bit, indicates Cloned traffic
        702
```

FIG. 7

STEERING OF CLONED TRAFFIC IN A SERVICE FUNCTION CHAIN

FIELD

This disclosure pertains to steering of cloned traffic in a service function chain (SFC).

BACKGROUND

While working on key security use-cases for service chaining, certain traffic can be cloned (or mirrored). Examples of such use cases include:

DDOS behavioral detector needs to perform analytics on cloned traffic to detect DDOS attack and signal the DOTS server in the DDoS mitigation service provider network to mitigate the attack.

Snort in intrusion detection system (IDS) mode needs to process cloned traffic to detect attacks and generate alerts.

Sandboxing technique used by Cisco AMP and Fireye to detect APT threats, traffic is cloned to multiple virtual machines (with different OS versions, browsers etc.) to detect if any of the VM get infected.

DDOS behavioral detection, Snort, Sandboxing etc. can be performed by different service functions in a SFC domain. SFC needs a mechanism to steer cloned traffic to be processed by multiple service functions in the service function path.

At the same time, SFC currently has no concept of cloned or mirrored traffic, and no mechanism to steering such cloned traffic and correlate it.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts.

FIGS. 1B-C are schematic diagrams of different service paths realized using service function chaining, according to some embodiments of the disclosure;

FIG. 7 is a schematic diagram of a network service header base header in accordance with embodiments of the present disclosure.

DETAILED DESCRIPTION

Figure 1A:
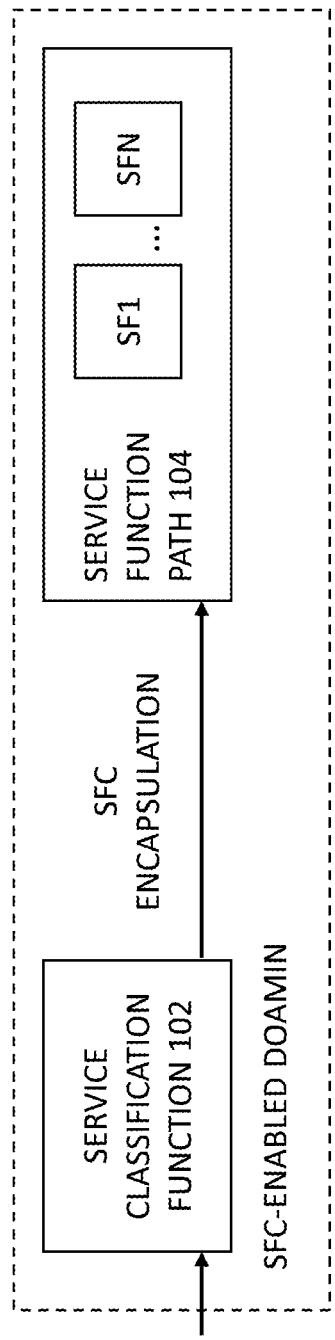
FIG. 1A is a schematic diagram of a Service Function Chain (SFC), which may include an initial Classification function, as an entry point into a Service Function Path (SFP), according to some embodiments of the disclosure.

This disclosure describes steering of cloned traffic in a service function chain (SFC). In embodiments, this disclosure describes steering, managing, and analyzing cloned traffic in a service function chain (SFC). This enables DDoS open threat signaling (DOTS) behavioral detection, Snort intrusion detection system (IDS), and FireEye sandboxing use cases, or other use cases, without negatively affecting use traffic (e.g., by mis-resetting connections or modifying the traffic). SFC currently has no concept of cloned or mirrored traffic, and no mechanism to steering such cloned traffic and correlate it. This disclosure describes steering cloned traffic in a service function chain.

The steering of cloned traffic in a service function chain as described herein can be applicable to many other use cases and is highly generalized.

Aspects of the embodiments are directed to a computer-readable non-transitory medium comprising one or more instructions for steering cloned traffic in a service function chain. Aspects of the embodiments are directed to a service classifier network element that includes at least one memory element having instructions stored thereon, and at least one processor coupled to the at least one memory element and configured to execute the instructions.

The instructions when executed on a processor are operable to create a cloned data packet by creating a copy of a data packet; activate a mirror bit in a network service header (NSH) of the cloned data packet, the mirror bit identifying the cloned packet to a service function forwarder network element as a cloned packet; and transmit the cloned packet to the service function forwarder network element.

In some embodiments, the mirror bit is part of a base header of the NSH.

In some embodiments, the instructions are further operable when executed to set a type length value (TLV) in the NSH to indicate that the cloned packet is a cloned packet to a service function forwarder network element.

In some embodiments, the instructions are further operable when executed to set a service index (SI) in the NSH based on the length of a service function path. In some embodiments, the instructions are further operable when executed to set a service path identifier (SPI) in the NSH of the cloned packet. The instructions may be further operable when executed to create a plurality of cloned packets by copying the data packet a plurality of times; and set the SI for each cloned packet of the plurality of cloned packets to 1. In some embodiments, the instructions further operable when executed to: receive a service function path for the plurality of cloned packets; identify a unique service path identifier for each cloned packet of the plurality of cloned packets; and transmit each cloned packet of the plurality of cloned packets to a corresponding service function forwarder network element simultaneously. In some embodiments, the instructions are further operable when executed to transmit each cloned packet to a corresponding service function forwarder network element based, at least in part, on the unique service path identifier. In some embodiments, the instructions are further operable when executed to transmit each cloned packet by one of unicast or multicast. In some embodiments, the instructions are further operable when executed to determine that the data packet is to be cloned based, at least in part, on a determination that the data packet is to be analyzed for security or malware detection or for performance measurement. A Control Plane network element may provision multiple SFPs from the service classifier (e.g., in a star fashion) towards all relevant service functions. Cloned traffic can be dropped by the service function forwarder after the cloned traffic is processing by the service function.

If a network device drops the cloned TCP data packet, then the network device can signal the service classifier to drop the ACK for the data packet, so the data packet gets re-transmitted. The SFs and SFFs, using the mirror bit in a network service header (NSH), can identify the SF and/or SFF are acting on cloned traffic and will not modify the cloned packets or reset the connection or drop the cloned packets.

The last SFF in the SFP acting on the cloned traffic should drop the cloned traffic once the service index (SI) reaches zero. The mirror bit in a network service header (NSH) helps the last SFF in the SFP to determine that it is only dropping the cloned traffic and not the normal traffic because of a loop. The mirror bit in NSH TLV further helps with more context on the cloned traffic.

In some embodiments, the last SFF in the SFP can record the cloned traffic before dropping the cloned traffic. In some embodiments, the last SFF can encapsulate and send the cloned traffic to a server for analysis if there is specific information captured on the cloned packet's TLV metadata.

Aspects of the embodiments are directed to a method for steering cloned data traffic in a service function chain. The method may include creating a cloned data packet by creating a copy of a data packet; activating a mirror bit in a network service header (NSH) of the cloned data packet, the mirror bit identifying the cloned packet to a service function forwarder network element as a cloned packet; and transmitting the cloned packet to the service function forwarder network element.

In some embodiments, wherein the mirror bit is part of a base header of the NSH.

Some embodiments may also include setting a type length value (TLV) in the NSH to indicate that the cloned packet is a cloned packet to a service function forwarder network element.

Some embodiments may also include setting a service index (SI) in the NSH based on the length of a service function path.

Some embodiments may also include setting a service path identifier (SPI) in the NSH of the cloned packet.

Some embodiments may also include creating a plurality of cloned packets by copying the data packet a plurality of times; and setting the SI for each cloned packet of the plurality of cloned packets to 1.

Some embodiments may also include receiving a service function path for the plurality of cloned packets; identifying a unique service path identifier for each cloned packet of the plurality of cloned packets; and transmitting each cloned packet of the plurality of cloned packets to a corresponding service function forwarder network element simultaneously.

Some embodiments may also include transmitting each cloned packet to a corresponding service function forwarder network element based, at least in part, on the unique service path identifier.

Some embodiments may also include transmitting each cloned packet by one of unicast or multicast.

Some embodiments may also include determining that the data packet is to be cloned based, at least in part, on a determination that the data packet is to be analyzed for security or malware detection or for performance measurement

EXAMPLE EMBODIMENTS

Basics of Network Service Chaining or Service Function Chains in a Network

To accommodate agile networking and flexible provisioning of network nodes in the network, Service Function Chains (SFC) can be used to ensure an ordered set of Service Functions (SF) to be applied to packets and/or frames of a traffic flow. SFC provides a method for deploying SFs in a way that enables dynamic ordering and topological independence of those SFs. A service function chain can define an ordered set of service functions that is applied to packets and/or frames of a traffic flow, where the ordered set of service functions are selected as a result of classification. The implied order may not be a linear progression as the architecture allows for nodes that copy to more than one branch. The term service chain is often used as shorthand for service function chain.

FIG. 1A illustrates a Service Function Chain (SFC), which may include an initial service classification function 102, as an entry point into a Service Function Path (SFP) 104 (or service path). The (initial) service classification function 102 prescribes a service path, and encapsulates a packet or frame with the service path information which identifies the service path. The classification potentially adds metadata, or shared context, to the SFC encapsulation part of the packet or frame. The service function path 104 may include a plurality of service functions (shown as "SF1," . . . , "SFN").

A service function can be responsible for specific treatment of received packets. A service function can act at the network layer or other OSI layers (e.g., application layer, presentation layer, session layer, transport layer, data link layer, and physical link layer). A service function can be a virtual instance or be embedded in a physical network element such as a service node. When a service function or other modules of a service node is executed by at least one processors of the service node, the service function or other modules can be configured to implement any one of the methods described herein. Multiple service functions can be embedded in the same network element. Multiple instances of the service function can be enabled in the same administrative SFC-enabled domain. A non-exhaustive list of SFs includes: firewalls, WAN and application acceleration, Deep Packet Inspection (DPI), server load balancers, NAT44, NAT64, HOST_ID injection, HTTP Header Enrichment functions, TCP optimizer, etc. An SF may be SFC encapsulation aware, that is it receives, and acts on information in the SFC encapsulation, or unaware in which case data forwarded to the service does not contain the SFC encapsulation.

A Service Node (SN) can be a physical network element (or a virtual element embedded on a physical network element) that hosts one or more service functions (SFs) and has one or more network locators associated with it for reachability and service delivery. In many standardization documents, "service functions" can refer to the service nodes described herein as having one or more service functions hosted thereon. Service Function Path (SFP) (or sometimes referred simply as service path) relates to the instantiation of a SFC in the network. Packets follow a service path from a service classifier through the requisite service functions.

FIGS. 1B-1C illustrate different service paths realized using service function chaining. These service paths can be implemented by encapsulating packets of a traffic flow with a network service header (NSH) or some other suitable packet header which specifies a desired service path (e.g., by identifying a particular service path using service path information in the NSH). In the example shown in FIG. 1B, a service path 120 can be provided between end point 160 and endpoint 180 through service node 106 and service node 110. In the example shown in FIG. 1C, a service path 130 (a different instantiation) can be provided between end point 170 and endpoint 190 through service node 106, service node 108, and service node 112.

Network Service Header (NSH) Encapsulation

Generally speaking, an NSH includes service path information, and NSH is added to a packet or frame. For instance, an NSH can include a data plane header added to packets or frames. Effectively, the NSH creates a service plane. The NSH includes information for service chaining, and in some cases, the NSH can include metadata added and/or consumed by service nodes or service functions. The packets and NSH are encapsulated in an outer header for transport. To implement a service path, a network element such as a service classifier (SCL) or some other suitable SFC-aware network element can process packets or frames of a traffic flow and performs NSH encapsulation according to a desired policy for the traffic flow.

Figure 2:
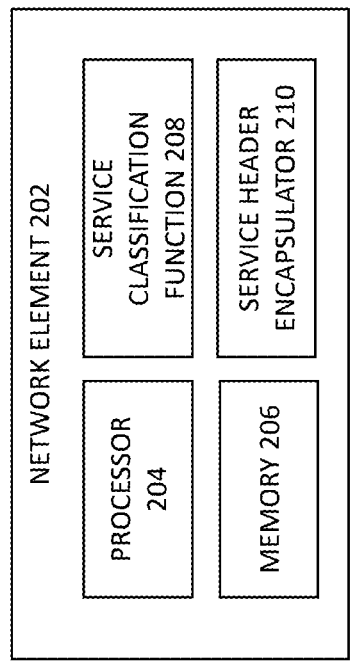
FIG. 2 is a schematic diagram of a system view of a Service Chain Function-aware network element for prescribing a service path of a traffic flow, according to some embodiments of the disclosure.

FIG. 2 shows a system view of SFC-aware network element, e.g., such as a (initial) service classifier (SCL), for prescribing a service path of traffic flow, according to some embodiments of the disclosure. Network element 202 includes processor 204, (computer-readable non-transitory) memory 206 for storing data and instructions. Furthermore, network element 202 includes service classification function 208 and service header encapsulator 210 (both can be provided by processor 204 when processor 204 executes the instructions stored in memory 206).

The service classification function 208 can process a packet of a traffic flow and determine whether the packet requires servicing and correspondingly which service path to follow to apply the appropriate service. The determination can be performed based on business policies and/or rules stored in memory 206. Once the determination of the service path is made, service header encapsulator 210 generates an appropriate NSH having identification information for the service path and adds the NSH to the packet. The service header encapsulator 210 provides an outer encapsulation to forward the packet to the start of the service path. Other SFC-aware network elements are thus able to process the NSH while other non-SFC-aware network elements would simply forward the encapsulated packets as is. Besides inserting an NSH, network element 202 can also remove the NSH if the service classification function 208 determines the packet does not require servicing.

Network Service Headers

A network service header (NSH) can include a (e.g., 64-bit) base header, and one or more context headers. Generally speaking, the base header provides information about the service header and service path identification (e.g., a service path identifier), and context headers can carry metadata (such as the metadata described herein reflecting the result of classification). For instance, an NSH can include a 4-byte base header, a 4-byte service path header, and optional context headers. The base header can provide information about the service header and the payload protocol. The service path header can provide path identification and location within a path. The (variable length) context headers can carry metadata and variable length encoded information. The one or more optional context headers make up a context header section in the NSH. For instance, the context header section can include one or more context header fields having pieces of information therein, describing the packet/frame. Based on the information in the base header, a service function of a service node can derive policy selection from the NSH. Context headers shared in the NSH can provide a range of service-relevant information such as traffic classification. Service functions can use NSH to select local service policy.

Service Nodes and Proxy Nodes

Figure 3:
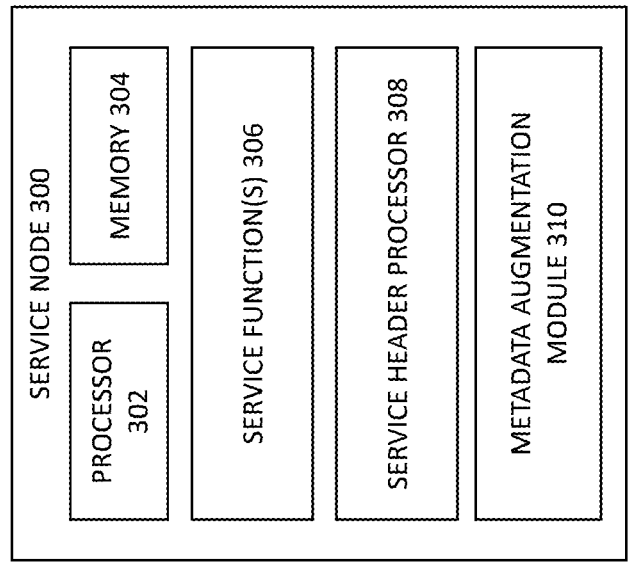
FIG. 3 is a schematic diagram of a system view of a service node, according to some embodiments of the disclosure.

Once properly encapsulated, the packet having the NSH is then forwarded to one or more service nodes where service(s) can be applied to the packet/frame. FIG. 3 shows a system view of a service node, according to some embodiments of the disclosure. Service node 300, generally a network element, can include processor 302, (computer-readable non-transitory) memory 304 for storing data and instructions. Furthermore, service node 300 includes service function(s) 306 (e.g., for applying service(s) to the packet/frame, classifying the packet/frame) and service header processor 308. The service functions(s) 306 and service header processor 306 can be provided by processor 302 when processor 302 executes the instructions stored in memory 304. Service header processor 308 can extract the NSH, and in some cases, update the NSH as needed. For instance, the service header processor 308 can decrement the service index if a service index=0 is used to indicate that a packet is to be dropped by the service node 300. In another instance, the service header processor 308 or some other suitable module provide by the service node can update context header fields if new/updated context is available.

Metadata Augmentation

Besides general servicing of the NSH, a service node can provide additional functionality by augmenting the metadata, e.g., by adding precision to the metadata. The present disclosure describes some exemplary methods for augmenting metadata of a NSH.

Generally speaking, metadata in the NSH reflects some form of classification. At the initial classifier, a packet or frame can be classified, where a first metadata in the NSH would reflect the classification. For example, the initial classifier can classify that the packet/frame of a traffic flow is associated with e.g., an "employee" or "guest". When a first service node in the service path processes the first metadata in the NSH, the first service node can apply a first policy accordingly based on the first metadata.

With augmentation, the first service node can also further classify the packet or frame as being associated with, e.g., application X, and accordingly generate a second metadata. The first service node can use this new information, i.e., the second metadata, to augment the first metadata. The NSH for the packet/frame can carry the second metadata, which augments the first metadata, as the packet/frame traverses to the subsequent service node(s) in the service path.

When a subsequent, second service node processes the NSH with the second metadata, the new information provided by the second metadata can affect how the second service node processes the packet or frame. For instance, the second service node may decide to deny the packet/frame because of the second metadata.

The context being shared among service nodes is improved as the metadata is augmented when the packet/frame travels over the service path. The service nodes can optionally serve as a supplemental/additional "classifier" in the service path by classifying the packet/frame using their own capabilities. Through augmentation, a service node in the service path can contribute to the information being shared over the service function chain. The semantics (e.g., meaning, encoding scheme) can be conveyed in-line (in the service plane) or in the control plane.

Augmentation can be advantageous if the initial classifier does not have a particular classification functionality (or cannot conveniently or efficiently provide such functionality), or might not have information needed to know more about the packet. Common example is that the initial classifier is a hardware device that cannot look deep into the packet to get application information about the packet. The first service node, e.g., a firewall, a deep packet inspection engine, a load balancer, etc., may have greater classification capabilities. For instance, the initial classifier may provide first metadata which specifies the packet/frame as being associated with a guest (e.g., as opposed to an employee). A first service node, a deep packet inspection engine may find out that the packet/frame is associated with email (e.g., as opposed to streaming video content). The first service node can augment the first metadata by adding additional information, e.g., using second metadata which specifies the traffic is associated with email. A second service node, e.g., a firewall, can process the packet/frame based on the second metadata accordingly. For instance, the firewall can apply a policy based on the second metadata, wherein the policy may decide to block email traffic of guests. As the packet/frame traverses over the service path over onto other service nodes, more augmentation can occur. The semantics of the second metadata of the network service header can be shared via a control plane of the first service node and the second service node.

Within the context of the application, "metadata" refers to one or more pieces of information (e.g., bits of data, encoded values) in a context header section of a network service header. Metadata can refer to contents of the entire context header section, which can include the contents of one or more context header fields describing various attributes of the packet/frame. Metadata can also refer to contents of one individual context header field or a subset of context header fields in the context header section.

Moreover, the terms "first service node" and "second service node" does not necessarily imply that the "first service node" and the "second service node" are the first and second service nodes at the beginning of the service path that the packet/frame reaches as the packet/frame traverses over the service path. For instance, the first service node can be any suitable one of the service nodes among many service nodes in the service path (e.g., third one the packet/frame reaches as it traverses the service path, fourth one, fifth one, etc.). The second service node can be any suitable one of the service node(s) subsequent to the first service node downstream in the service path.

Exemplary Advantages of Metadata Augmentation in a Service Function Chain

To provide for augmenting metadata of a network service header, the service node 300 of FIG. 3 further includes metadata augmentation module 310 (which can be provided by processor 302 when processor 302 executes the instructions stored in memory 304). The service function(s) 306 and/or service header processor 308 of the service node 300 can perform classification. Upon receipt of a packet/frame, the service function can inspect the payload, and the service header processor can inspect the metadata or other header information in the NSH. The metadata and/or the payload can be used for classification purposes. For instance, the service function 306 can classify the packet/frame based on the metadata extracted from the NSH and/or the payload. The metadata augmentation module 310 can generate the second metadata based on the classification and perform augmentation of the first metadata using the second metadata.

Figure 4:
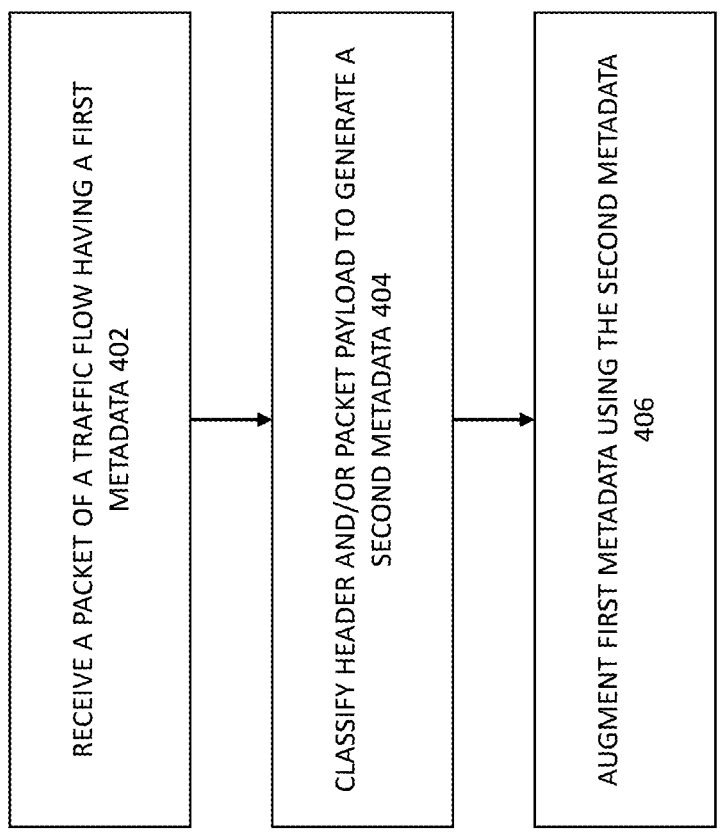
FIG. 4 is a flow diagram illustrating a method for augmenting metadata in a network service header, according to some embodiments of the disclosure.

Specifically, various parts/modules of the service node, e.g., the service function 306, the service header processor 308, and the metadata augmentation module 310, can implement the method illustrated in FIG. 4. FIG. 4 shows a flow diagram illustrating a method for augmenting metadata in a network service header, according to some embodiments of the disclosure. Referring to box 402, a first service node receives a packet or frame of a traffic flow. The packet has a payload and the network service header including a first metadata and a first service path information for the traffic flow. Referring to box 404, the first service node classifies at least one of the payload and the first metadata to generate a second metadata different from the first metadata. Referring to box 406, the first service node augments the first metadata using the second metadata before forwarding the packet or frame to a second service function node.

Providing a mechanism for the service nodes to augment the metadata for other service nodes downstream in the SFP can have many advantages. For instance, one advantage includes simplifying or reducing the load on access/edge (or other low power) platforms by allowing other service nodes to perform further classification. Effectively, the mechanism enables minimal classification and allows minimal metadata to be used for a secondary classifier mid-SFP to augment metadata. The mechanism also allows classification based on metadata only, or metadata with additional deep packet inspection of the payload, if desired. In some cases, the metadata can be used as part of the classification input, such that a service node can augmenting the metadata and generate an output for the follow-on classifier, i.e., a service node downstream over the SFP. The mechanism effectively provides for virtualization of the classifier function; the primary classifier can add metadata to be used by a secondary classifier to augment the same.

Various Embodiments of Metadata Augmentation

Augmentation of metadata can be implemented in different ways. As described, initial classification happens and as part of this classification, an SFP is chosen, and specific metadata gets potentially added to the SFC encapsulation of a packet through augmentation. The secondary classification can occur based on metadata alone or with a combination of metadata and payload details. The resulting SFC encapsulation at the first service node, augmenting the metadata, can augment the first metadata the existing metadata with additional details.

In one instance, augmenting the first metadata comprises appending the second metadata to the first metadata of the network service header or adding the second metadata to the network service header (e.g., appending the first metadata with the second metadata in the metadata field before providing the packet/frame to the subsequent service node).

In another instance, augmenting the first metadata comprises replacing the first metadata of the network service header with the second metadata (e.g., replacing the contents of the metadata field of the NSH with the second metadata before providing the packet providing the packet/frame to the subsequent service node). If desired, the resulting SFC encapsulation at the first service node, augmenting the metadata, can encapsulate the packet/frame with new metadata (SFC-in-SFC) by generating a different network service header (or other suitable outer header) having the second metadata and encapsulating the packet or frame of the traffic flow with the different network service header.

Broadly speaking, the initial classifier and the service node(s) in the SFP leverages the augmentation mechanism to provide rich and intelligent classification that affect policies being applied to various traffic flows. The augmentation mechanism enables the second service node to apply a policy on the packet or frame of the traffic flow based on the second metadata (e.g., having additional information about the packet/frame that the NSH would otherwise lack without augmentation).

Typically, the network service header including the first metadata and the first service path information is a result of an initial classification of the packet or frame performed by an initial service classifier. The classification performed by the first service node, generating the second metadata, can be different from the initial classification. The differences in classifications and functionality allow the metadata to improve as the packet/frame traverses through more classifiers. In one example, the initial service classifier is not capable of performing the classification performed by the first service node. In some cases, the second metadata can correct an error of the first metadata, if the initial service classifier did generate a correct classification. In certain cases, the second metadata refines the initial classification with additional information about the packet or frame of the traffic flow.

Policy Enforcement Using Metadata in Network Service Headers

Metadata information in the NSH is usually used for policy enforcement and network context for forwarding post service delivery. Service function instances in service nodes can derive policy selection from the NSH. Context shared in the service header can provide a range of service-relevant information such as traffic classification usable for policy enforcement. Service functions can use the NSH to select local service policy. NSH provides the ability to pass along metadata or augmented metadata over a service path.

The metadata used by various service functions may be derived from several sources. In one example, network nodes information provided by network nodes can indicate network-centric information (such as VRF or tenant) that may be used by service functions, or conveyed to another network node post-service pathing. In another example, external (to the network) systems such as orchestration, often has information that is valuable for service function policy decisions (in some cases, this information may not necessarily be deduced by network nodes). An orchestration platform placing workloads "knows" what application is being instantiated and can communicate this information to all NSH nodes via metadata. In yet another example, service functions can perform very detailed and valuable classification, in some cases they may terminate, and be able to inspect encrypted traffic. Service nodes having such service functions may update, alter or impose metadata information.

Regardless of the source, metadata reflects the "result" of classification. The granularity of classification may vary. For example, a network switch might only be able to classify based on 5-tuple, whereas, a service function may be able to inspect application information. Regardless of granularity, the classification information is represented as metadata in NSH. Once the metadata is added to NSH, the metadata is carried along the service path. Participant service nodes, e.g., service functions in the participant service nodes, can receive the metadata, and can use that metadata for local decisions and policy enforcement.

Figure 5:
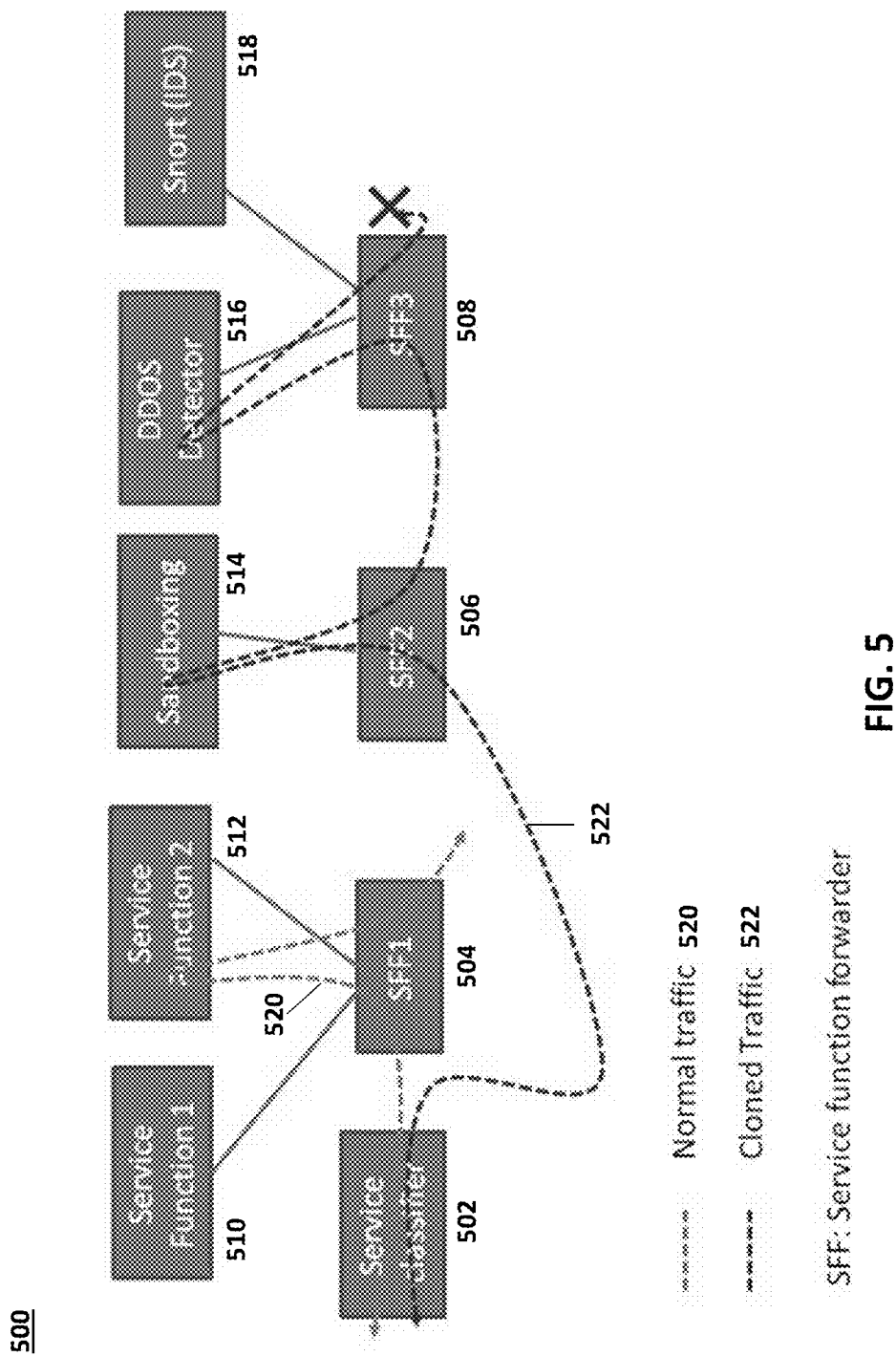
FIG. 5 is a schematic diagram of cloned traffic steering in a service function chain.

FIG. 5 is a schematic diagram of cloned traffic steering in a service function chain 500. The service function chain 500 can include a service classifier 502 (referred to as a classifier 502). The classifier 502 is configured to mark traffic as "cloned" or "mirrored" traffic 522. The service function chain 500 includes one or more service function forwarder network elements 504-508 that can forward traffic 520 and cloned traffic 522 to one or more service functions, such as service functions 510-512, as well as to sandboxing service function 514, DDOS detector service function 516, and snort (IDS) service function 518, as well as other service functions. Each service functions (SFs) are configured to act differently on cloned traffic 522 (e.g., by way of not resetting connections, etc.).

Figure 6A:
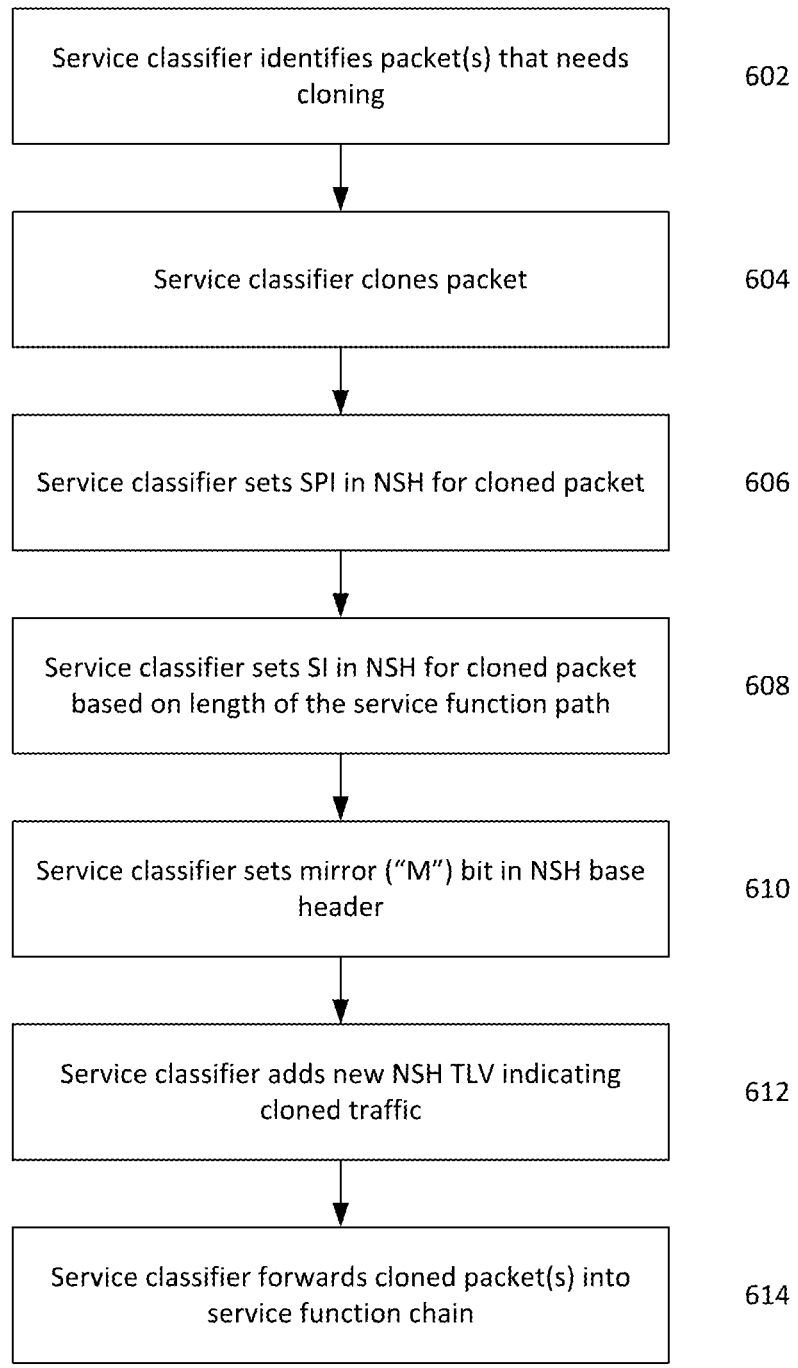
FIG. 6A is a process flow diagram of a cloned traffic steering at a service classifier network element in accordance with embodiments of the present disclosure.

FIG. 6A is a process flow diagram 600 of cloned traffic steering in accordance with embodiments of the present disclosure. The service classifier can identifies that certain traffic needs to cloned for processing (e.g., by multiple service functions) (602). Service classifier clones the packet (604). The service classifier can set the SPI for a service path (606). The service classifier sets the service index (SI) depending on the length of the service function path (608). The service classifier sets the "Mirrored/Cloned bit" in the Base Header (610). The service classifier includes a new NSH type length value (TLV) indicating to the SFFs and SFs in the SFP that they are acting on cloned traffic (612). Service classifier learns the exact length of the service function path for the cloned traffic from SFC control plane. The C bit in the Type field of the new TLV must be set to 1 indicating that the TLV is mandatory for the receiver to understand and process. The service classifier can forward the cloned packet into the service function chain (614).

Figure 6B:
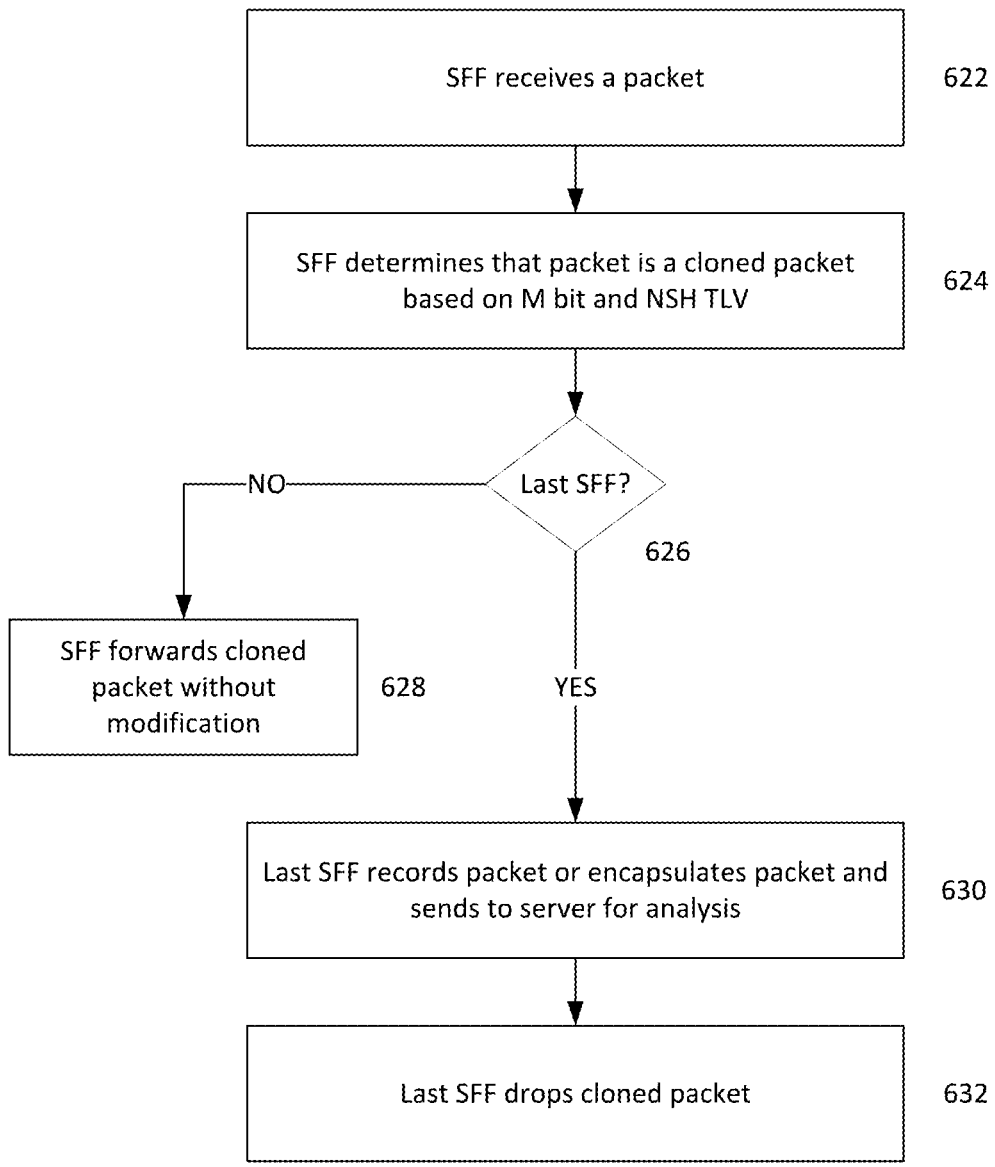
FIG. 6B is a process flow diagram of a cloned traffic steering at a service function forwarder network element in accordance with embodiments of the present disclosure.

FIG. 6B is a process flow diagram of a cloned traffic steering at a service function forwarder network element in accordance with embodiments of the present disclosure. The SFF can receive a packet (622). The SFFs can determine that the packet is a cloned packet using the "M" bit, and in some embodiments, also using the NSH TLV.

The SFF can determine whether it is the last SFF based on the SI reaching zero (626). The last SFF in the SFP acting on the cloned traffic should drop the cloned traffic once the service index (SI) reaches zero (628). If the SFF is not the last SFF, the SF will not modify the cloned packets or reset the connection or drop the cloned packets (630).

The new NSH Bit-flag value signals to the last SFF in the SFP to determine that it is only dropping the cloned traffic and not the normal traffic because of a loop. The new NSH TLV further identifies more context on the cloned traffic. The new TLV signals to the SFFs not to trigger service function path debugging to detect loops in the SFP just because service index value reached zero value. Cloned traffic can be dropped by the service function forwarder after the cloned traffic is processing by the service function. The SFs and SFFs, using the mirror bit in a network service header (NSH), can identify the SF and/or SFF are acting on cloned traffic and will not modify the cloned packets or reset the connection or drop the cloned packets.

The last SFF in the SFP acting on the cloned traffic can drop the cloned traffic once the service index (SI) reaches zero. In embodiments, the last SFF can record the cloned traffic before dropping, or encapsulate and sent it to a server for analysis if there is specific info captured on the cloned packet's TLV MD In some embodiments, a Control Plane network element may provision multiple SFPs from the service classifier (e.g., in a star fashion) towards all relevant service functions.

Further, the concepts described herein work for different types of potential metadata, as well as other metadata types.

FIG. 7 is a schematic diagram of a network service header base header 700 in accordance with embodiments of the present disclosure. The NSH base header includes a bit indicating that the packet is a mirror packet. The NSH includes an SPI and SI using traditional semantics for the SPI field, and using SI to limit traffic scope. In the NSH Metadata 2, a TLV is included to capture specific information about cloned/Mirrored traffic. This information includes which copy, how many copies, and other fields.

Figure 8:
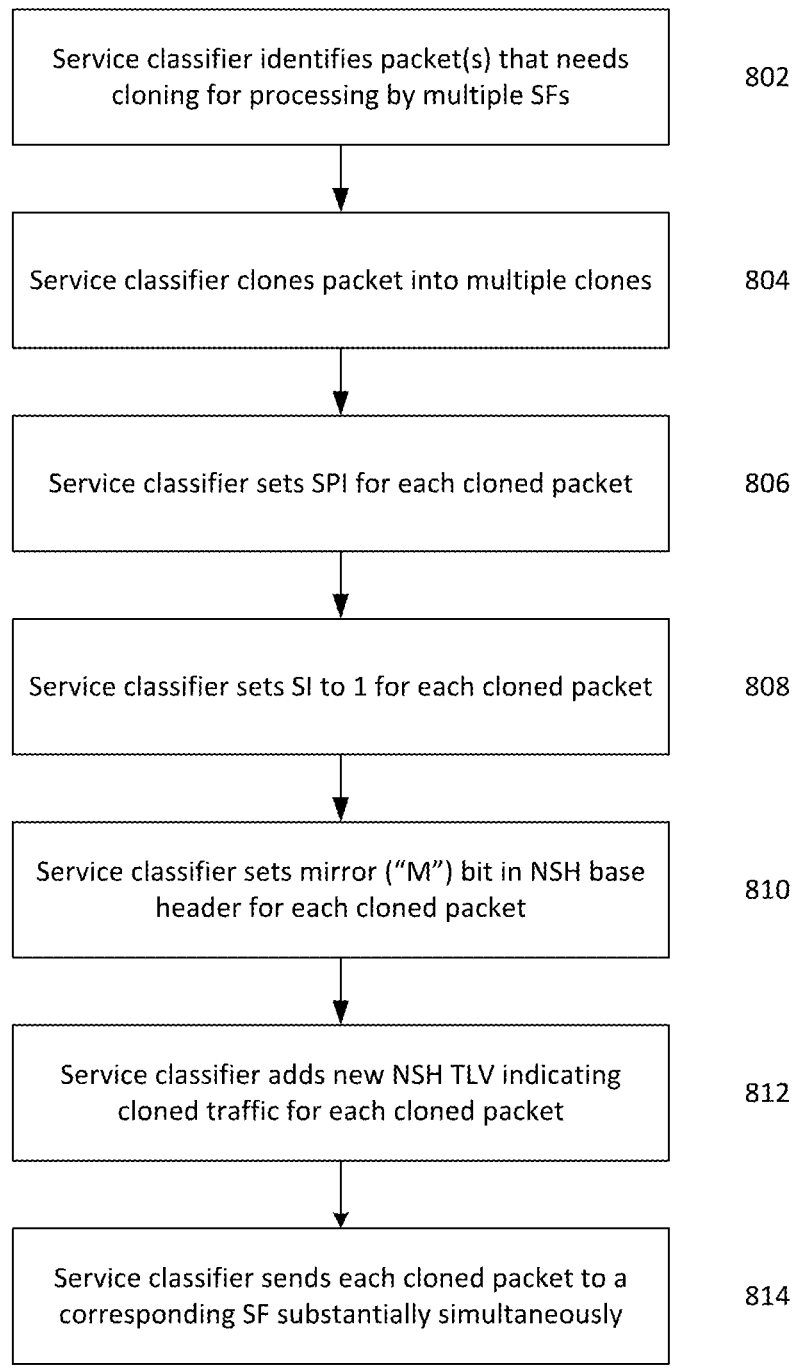
FIG. 8 is a process flow diagram of steering cloned traffic in accordance with embodiments of the present disclosure.

Extended Use Case:

FIG. 8 is a process flow diagram of steering cloned traffic in accordance with embodiments of the present disclosure. A service classifier identifies that certain traffic needs to cloned for processing by multiple service functions (802). The service classifier creates multiple copies of the traffic equal to the number of service functions that must process the cloned traffic (804). Service classifier sets SPI for each cloned packet (806). Service classifier sets SI for each cloned packet to 1, so that cloned traffic is dropped by the SFF after processing by the SF (808). Service classifier sets "M" bit in NSH for each cloned packet indicating that the packet is a cloned packet (810). Service classifier includes new NSH TLV indicating the SFF and SF in the SFP that they are acting on cloned traffic (812). and sets the service index to 1. The service classifier forwards the cloned traffic to each of these service functions (substantially) simultaneously (814). This cloned traffic can be sent as multicast or unicast.

The Control Plane can provision multiple SFPs from the Classifier, in a star fashion, towards all relevant SFs.

In both the above methods, if a network device drops the cloned TCP data packet then it should signal the service classifier to drop the ACK for the data packet, so the data packet gets re-transmitted.

The advantage of the method described in FIG. 8 is that all the service functions receive the cloned traffic in parallel and act on the cloned traffic simultaneously. The advantage of the method described in FIGS. 6A-6B is that it decreases the load on the service classifier to create multiple copies of the traffic.

Advantages of the present disclosure are readily apparent to those of ordinary skill in the art. As mentioned, the idea of cloned traffic in an SFC can be applied to other cases. One such key cases is Performance Measurement (PM). Specifically, by having two parallel SFPs (Service Function Paths) part of the same SFC (Service Function Chain), where the delta or difference between the two SFPs is constrained (for example, 1 SF difference, or 1 SFP is encrypted whereas the other SFP is not), then the merge point of the normal and cloned traffic can apply PM to the difference.

Within an SFC Domain (that is, from an SFC Classifier until the last SFF) this disclosure facilitates the execution of service functions and network functions on cloned traffic without actually acting on original traffic. This disclosure describes how to perform analytics on traffic without redirecting said traffic. To do so, the original traffic can be cloned (and in some embodiments, the traffic flow can be mirrored), and the cloned traffic can be acted on by the service functions.

This disclosure describes a Service Classifier that can clone traffic, as instructed by a controller. Additionally, a copy of a Service Function Path (SFP) for the original traffic is created, thereby preserving the SFP/SFC copy but directing this copy separately and differently.

The "mirror state" is indicated in the cloned packet's metadata. This metadata mirror bit prevents cloned traffic from leaking out of the SFC Domain.

This disclosure also facilitates using the SI (Service Index) differently for the copied traffic, to make traffic/packets/flows be acted upon at one very specific SF, and ensuring that cloned traffic does not leak outside the SFC Domain.

Variations and Implementations

Within the context of the disclosure, a network used herein represents a series of points, nodes, or network elements of interconnected communication paths for receiving and transmitting packets of information that propagate through a communication system. A network offers communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium.

In one particular instance, the architecture of the present disclosure can be associated with a service provider deployment. In other examples, the architecture of the present disclosure would be equally applicable to other communication environments, such as an enterprise wide area network (WAN) deployment, The architecture of the present disclosure may include a configuration capable of transmission control protocol/internet protocol (TCP/IP) communications for the transmission and/or reception of packets in a network.

As used herein in this Specification, the term 'network element' is meant to encompass any of the aforementioned elements, as well as servers (physical or virtually implemented on physical hardware), machines (physical or virtually implemented on physical hardware), end user devices, routers, switches, cable boxes, gateways, bridges, loadbalancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate the network service header features/operations thereof. This may be inclusive of appropriate algorithms and communication protocols that allow for the effective exchange of data or information.

In one implementation, nodes with NSH capabilities may include software to achieve (or to foster) the functions discussed herein for providing the NSH-related features/functions where the software is executed on one or more processors to carry out the functions. This could include the implementation of instances of service functions, service header processors, metadata augmentation modules and/or any other suitable element that would foster the activities discussed herein. Additionally, each of these elements can have an internal structure (e.g., a processor, a memory element, etc.) to facilitate some of the operations described herein. In other embodiments, these functions may be executed externally to these elements, or included in some other network element to achieve the intended functionality. Alternatively, these nodes may include software (or reciprocating software) that can coordinate with other network elements in order to achieve the functions described herein. In still other embodiments, one or several devices may include any suitable algorithms, hardware, software, components, modules, interfaces, or objects that facilitate the operations thereof.

In certain example implementations, the NSH-related functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store databases or metadata disclosed herein. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, service nodes, etc.) can include memory elements for storing information to be used in achieving the NSH-related features, as outlined herein. Additionally, each of these devices may include a processor that can execute software or an algorithm to perform the NSH-related features as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of using and augmenting NSH metadata, as potentially applied to a myriad of other architectures.

It is also important to note that the various steps described herein illustrate only some of the possible scenarios that may be executed by, or within, the nodes with NSH capabilities described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by nodes with NSH capabilities in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A computer-readable non-transitory medium comprising one or more instructions for steering cloned traffic in a service function chain, the instructions when executed on a processor are operable to:
   create a plurality of cloned data packets by creating copies of a data packet;
   activate a mirror bit in a network service header (NSH) of the cloned data packet, the mirror bit identifying the cloned packet to a service function forwarder network element as a cloned packet;
   set an indicator in each of the cloned data packets, the indicator representing that the corresponding cloned data packet is to be dropped after processing by a service function forwarder;
   identify a unique service path identifier for each cloned packet of the plurality of cloned packets; and
   transmit each of the cloned packets to a corresponding service function forwarder network element simultaneously based on the service function path identifier.

2. The computer-readable non-transitory medium of claim 1, wherein the mirror bit is part of a base header of the NSH.

3. The computer-readable non-transitory medium of claim 1, the instructions further operable when executed to set a type length value (TLV) in the NSH to indicate that the cloned packet is a cloned packet to a service function forwarder network element.

4. The computer-readable non-transitory medium of claim 1, the instructions further operable when executed to set a service index (SI) in the NSH based on the length of a service function path.

5. The computer-readable non-transitory medium of claim 4, the instructions further operable when executed to set a service path identifier (SPI) in the NSH of the cloned packet.

6. The computer-readable non-transitory medium of claim 1, the instructions further operable when executed to:
receive a service function path for the plurality of cloned packets.

7. The computer-readable non-transitory medium of claim 6, the instructions further operable when executed to transmit each cloned packet to a corresponding service function forwarder network element based, at least in part, on the unique service path identifier.

8. The computer-readable non-transitory medium of claim 6, the instructions further operable when executed to determine that the data packet is to be cloned based, at least in part, on a determination that the data packet is to be analyzed for security or malware detection or for performance measurement.

9. The computer-readable non-transitory medium of claim 1, the instructions further operable when executed to transmit each cloned packet by one of unicast or multicast.

10. A service classifier network element of a service function chain, the service classifier network element comprising:
at least one memory element having instructions stored thereon;
at least one processors coupled to the at least one memory element and configured to execute the instructions to cause the service classifier network element to:
create a plurality of cloned data packets by creating copies of a data packet;
activate a mirror bit in a network service header (NSH) of the cloned data packet, the mirror bit identifying the cloned packet to a service function forwarder network element as a cloned packet;
set an indicator in each of the cloned data packets, the indicator representing that the corresponding cloned data packet is to be dropped after processing by a service function forwarder;
identify a unique service path identifier for each cloned packet of the plurality of cloned packets; and
transmit each of the cloned packets to a corresponding service function forwarder network element simultaneously based on the service function path identifier.

11. The service classifier network element of claim 10, wherein the mirror bit is part of a base header of the NSH.

12. The service classifier network element of claim 10, the instructions further operable when executed to set a type length value (TLV) in the NSH to indicate that the cloned packet is a cloned packet to a service function forwarder network element.

13. The service classifier network element of claim 10, the instructions further operable when executed to set a service index (SI) in the NSH based on the length of a service function path.

14. The service classifier network element of claim 13, the instructions further operable when executed to set a service path identifier (SPI) in the NSH of the cloned packet.

15. The service classifier network element of claim 10, the instructions further operable when executed to:
receive a service function path for the plurality of cloned packets.

16. The service classifier network element of claim 15, the instructions further operable when executed to transmit each cloned packet to a corresponding service function forwarder network element based, at least in part, on the unique service path identifier.

17. The service classifier network element of claim 15, the instructions further operable when executed to determine that the data packet is to be cloned based, at least in part, on a determination that the data packet is to be analyzed for security or malware detection.

18. The service classifier network element of claim 10, the instructions further operable when executed to transmit each cloned packet by one of unicast or multicast.

19. A method, comprising:
creating a plurality of cloned data packets by creating copies of a data packet;
activating a mirror bit in a network service header (NSH) of the cloned data packet, the mirror bit identifying the cloned packet to a service function forwarder network element as a cloned packet;
setting an indicator in each of the cloned data packets, the indicator representing that the corresponding cloned data packet is to be dropped after processing by a service function forwarder;
identifying a unique service path identifier for each cloned packet of the plurality of cloned packets; and
transmitting each of the cloned packets to a corresponding service function forwarder network element simultaneously based on the service function path identifier.

20. The method of claim 19, wherein the mirror bit is part of a base header of the NSH.

* * * * *